US012718965B2

(12) United States Patent
Geets et al.

(10) Patent No.: US 12,718,965 B2
(45) Date of Patent: Aug. 25, 2026

(54) SYSTEM FOR PRODUCTION OF RADIOISOTOPES BY BREMSSTRAHLUNG COMPRISING A CURVED CONVERTER

(71) Applicants: Ion Beam Applications, Louvain-la-Neuve (BE); SCK CEN SON, Brussels (BE)

(72) Inventors: Jean-Michel Geets, Louvain-la-Neuve (BE); Frederic Stichelbaut, Louvain-la-Neuve (BE); Sebastien De Neuter, Louvain-la-Neuve (BE); Michel Abs, Louvain-la-Neuve (BE); Samy Bertrand, Louvain-la-Neuve (BE); Willem Leysen, Brussels (BE); Lucia Popescu, Brussels (BE)

(73) Assignees: Ion Beam Applications, Louvain-la-Neuve (BE); SCK CEN SON, Brussels (BE)

( * ) Notice: Subject to any disclaimer, the term of this patent is extended or adjusted under 35 U.S.C. 154(b) by 473 days.

(21) Appl. No.: 18/119,898

(22) Filed: Mar. 10, 2023

(65) Prior Publication Data

US 2023/0290532 A1 Sep. 14, 2023

(30) Foreign Application Priority Data

Mar. 10, 2022 (EP) .................................... 22161257

(51) Int. Cl.
*G21G 1/12* (2006.01)
*H01J 35/14* (2006.01)

(52) U.S. Cl.
CPC ................ *G21G 1/12* (2013.01); *H01J 35/14* (2013.01); *H01J 2235/08* (2013.01); *H01J 2235/1204* (2013.01)

(58) Field of Classification Search
CPC ............ G21G 1/10; G21G 1/12; G21G 1/001; G21K 1/05; G21K 5/04; G21K 2201/064–05; H01J 35/14
See application file for complete search history.

(56) References Cited

U.S. PATENT DOCUMENTS 4,599,741 A * 7/1986 Wittry ...................... G21K 1/06 378/45
5,077,774 A * 12/1991 Piestrup .................. G21K 5/08 378/34

(Continued)

FOREIGN PATENT DOCUMENTS

FR 2844916 A1 3/2004
WO WO 1999/052587 A2 10/1999

(Continued)

OTHER PUBLICATIONS

Extended European Search Report in counterpart European Patent Application No. 22161257.5, mailed Sep. 1, 2022, 5 pages.

(Continued)

*Primary Examiner* — Lily C Garner
(74) *Attorney, Agent, or Firm* — Finnegan, Henderson, Farabow, Garrett & Dunner, LLP

(57) ABSTRACT

A system for converting an electron beam into a photon beam includes an electron accelerator configured for generating an electron beam of accelerated electrons along an irradiation axis (Z); a scanning unit; a focusing unit for forming a focused beam converging towards a first focusing point (Fx) located on the irradiation axis (Z); a converting unit located between the focusing unit and the first focusing point (Fx), and comprising one or more bremsstrahlung converters, configured for converting the focused beam into a photon beam, wherein the one or more bremsstrahlung converters are curved such that the focused beam intersects each of the one or more bremsstrahlung converters with an (Continued)

intersecting angle comprised between 65° and 115° at all points, preferably between 75° and 105° at all points; and a target holder configured for holding a target.

20 Claims, 5 Drawing Sheets

(56) References Cited

U.S. PATENT DOCUMENTS

| | | | | |
|---|---|---|---|---|
| 5,744,813 | A * | 4/1998 | Kumakhov | G21K 1/06 250/505.1 |
| 6,777,692 | B2 * | 8/2004 | Jongen | A61L 2/20 250/455.11 |
| 8,414,822 | B2 * | 4/2013 | Galloway | B29C 35/0805 264/488 |
| 8,481,951 | B2 * | 7/2013 | Jongen | A61N 5/1048 250/363.08 |
| 9,594,036 | B2 * | 3/2017 | Yun | G01N 23/223 |
| 2005/0025902 | A1 * | 2/2005 | Kerluke | B05D 7/14 427/551 |
| 2011/0206187 | A1 * | 8/2011 | Lee | G21K 1/062 378/119 |
| 2012/0025105 | A1 * | 2/2012 | Brown | G21G 1/12 250/492.3 |
| 2015/0357069 | A1 * | 12/2015 | Yun | H01J 35/147 378/84 |
| 2020/0187339 | A1 * | 6/2020 | Freudenberger | H05G 1/025 |
| 2023/0040941 | A1 * | 2/2023 | Rotsch | H01J 35/116 |
| 2025/0062048 | A1 * | 2/2025 | Baumann | A61B 6/485 |

FOREIGN PATENT DOCUMENTS

| | | | | |
|---|---|---|---|---|
| WO | WO-9952587 | A2 * | 10/1999 | G21G 1/10 |
| WO | WO 2012/022491 | A1 | 2/2012 | |
| WO | WO-2017076961 | A1 * | 5/2017 | G21G 1/10 |

OTHER PUBLICATIONS

Figueroa, R.G. et al., “Physical characterization of single convergent beam device for teletherapy: theoretical and Monte Carlo approach,” *Physics in Medicine and Biology, Institute of Physics Publishing, Bristol GB*, vol. 60, No. 18, (Sep. 8, 2015), 16 pages.

* cited by examiner

γ = 90°, α = β + 90°
Lα / L90 = 1 / sin α

FIG.4(a) (P.A.)

65° ≤ α ≤ 115°
1 ≤ Lα / L90 = 1/sin α ≤ 1.1

α = 90°, γ = 90° - β
Lα / L90 = 1

FIG.5(a) (P.A.)

ci = di x β hi = di x sin β ci / hi = β / sin β > 1, ∀ β ∈ ]0, 90°]

SYSTEM FOR PRODUCTION OF RADIOISOTOPES BY BREMSSTRAHLUNG COMPRISING A CURVED CONVERTER

CROSS REFERENCE TO RELATED APPLICATIONS

This application claims priority of European patent application no. 22161257.5 filed on Mar. 10, 2022, which is incorporated herein by reference in its entirety.

TECHNICAL FIELD

The present disclosure relates to a device for the production of radioisotopes by irradiating a target with X-rays formed by Bremsstrahlung upon bombarding a converter with a high energy electron beam. In particular, the present disclosure relates to a specific geometry of the converter reducing the heat generated by the electron beam and allowing conventional cooling systems to be used to maintain the temperature of the converter within acceptable boundaries.

BACKGROUND

Radioisotopes can be produced by different reactions using charged particles or using of photonuclear reactions (e.g., X-rays). For example, $^{225}$Ac can be prepared by decay of $^{225}$Ra formed by photonuclear reactions caused by irradiation with X-rays of an $^{226}$Ra-target. The energy of the X-ray, which is directly dependent on the energy of the electron beam, must be controlled accurately to form the desired isotope. For example, irradiating an $^{226}$Ra-target can yield $^{223}$Ra, $^{224}$Ra, and $^{225}$Ra depending on the energy of the photoirradiation. Other examples of radioisotopes commonly used in medical applications include 99mTc, X-ray can be produced by irradiating a converter with a high energy electron beam. The converter is positioned between a source of high energy electron beam including electron accelerator such as a rhodotron or a linear accelerator; and the target (in the example, 226Ra). The converter is formed by foils of a high-Z metal, such as Ti, or Ta. As the converter is struck by the electron beam, the latter is decelerated, and the released energy is converted into X-ray radiation which reaches the target to form the desired radioisotope. This mechanism is referred to as "Bremsstrahlung".

As only a fraction of the energy of the electron beam is converted in Bremsstrahlung, the remaining fraction being converted into heat, thermal degradation of the converter is a serious issue. For this reason, the converter must be cooled. Conventional coolers use a gas such as He, or liquid such as water.

In order to enhance cooling of the converter and to enable a wider geometric spread of the resulting photon beam by the converter, WO1999052587 proposed to scan the electron beam over a scanned area of the converter using magnetic scanning coils. US20120025105 combines the scanning of the electron beam with the translation of the target synchronized with the scanning of the electron beam such that the target is constantly exposed to the full intensity of the Bremsstrahlung produced by the converter.

WO2017076961 describes a focusing lens used to collimate or focus an electron beam. Collimation of the electron beam is useful because a diverging electron beam would increase the divergence of photons generated. This would in turn require larger targets in order to collect the photons. The focusing lens can be formed from magnets, and may be a multipole lens such as quadrupole, hexapole, octupole lenses.

In spite of the foregoing improvements, it remains a problem to sufficiently cool the converter with conventional cooling systems to prevent the converter from thermally degrading prematurely. The present disclosure solves the dual problem of preventing premature thermal degradation of the converter using conventional cooling means, while at the same time maintaining a focused high intensity electron beam, and therefore a highly focused X-ray radiation. The solution proposed by the present disclosure to achieve this dual goal is explained below.

SUMMARY

The present disclosure is defined in the appended independent claims. Preferred embodiments are defined in the dependent claims. In particular, the present disclosure provides a system for the production of radioisotopes comprising,

- an electron accelerator configured for generating an electron beam of accelerated electrons along an irradiation axis (Z),
- a scanning unit configured for deviating the electron beam along a predefined scanning pattern to form a scanned beam,
- a focusing unit comprising one or more magnets configured for focusing the scanned beam over a first irradiation plane (X, Z) towards a first focusing point (Fx) located on the irradiation axis (Z), to form a focused beam, wherein the first irradiation plane (X, Z) is defined by the irradiation axis (Z) and a first transverse axis (X), with X⊥Z,
- a converting unit located between the focusing unit and the first focusing point (Fx), and comprising one or more bremsstrahlung converters, configured for converting the focused beam into a photon beam,
- a converter cooling system configured for cooling the one or more bremsstrahlung converters,
- a target holder configured for holding a target.

The electron accelerator, the scanning unit, the focusing unit, the converting unit, and the target holder, are all aligned along the irradiation axis (Z) and arranged downstream of one another in that sequence, wherein "downstream" is defined relative to the electron beam direction.

In a first embodiment, the scanning unit is configured for deviating the electron beam along the predefined scanning pattern extending along the first transverse axis (X) and a second transverse axis (Y), wherein X⊥Y⊥Z. The focusing unit is configured for focusing the scanned beam also over a second irradiation plane (Y, Z) towards a second focusing point (Fy) located on the irradiation axis (Z). The second focusing point (Fy) can be same as, or different from the first focusing point (Fx). The one or more bremsstrahlung converters are in the shape of an ovoid cap, preferably a spherical cap, defined by a first curved cross-section in the first irradiation plane (X, Z) and by a second curved cross-section in the second irradiation plane (Y, Z).

Each of the one or more bremsstrahlung converters has a first curved cross-section in the first irradiation plane (X, Z) which is preferably defined by a substantially circular arc of radius (d1-*dn*) centered on the first focusing point (Fx). A "substantially circular arc" is defined herein as a curved segment having a radius of curvature which varies by not more than 10% over the length of the curved cross-section. Alternatively, or concomitantly, each of the one or more bremsstrahlung converters has a second curved cross-section in the second irradiation plane (Y, Z) which is preferably defined by a substantially circular arc of radius (d1-*dn*) centered on the second focusing point (Fy). It is preferred that the second focusing point (Fy) be the same as the first focusing point (Fx) (i.e., Fx=Fy).

In a second embodiment, the scanning unit is configured for deviating the electron beam along the predefined scanning pattern extending along the first transverse axis (X) only. The one or more bremsstrahlung converters are in the shape of a section of cylinder, defined by a curved cross-section in the first transverse plane (X, Z), and generatrixes extending along a second transverse axis (Y), wherein X⊥Y⊥Z. Each of the one or more bremsstrahlung converters has a first curved cross-section in the first irradiation plane (X, Z) which is preferably defined by a substantially circular arc of radius (d1-*dn*) centered on the first focusing point (Fx).

The focusing unit can be configured for forming the focused beam with a focusing half-angle (β) formed at the first focusing point (Fx) with the irradiation axis (Z) on the first irradiation plane (X, Z) comprised between 20 and 55°, preferably between 30 and 45°.

The one or more bremsstrahlung converters can be made of tantalum (Ta) or tungsten (W) or titanium (Ti). Each of the one or more bremsstrahlung converters has a thickness (L90) measured along a radius of curvature which is preferably not more than 3 mm, preferably the thickness (L90) is comprised between 0.2 and 2.5 mm, more preferably between 0.5 and 1.5 mm. It is further preferred that a $n^{th}$ bremsstrahlung converter located nearest the target holder) has a larger thickness (L90) than a first bremsstrahlung converter located nearest the focusing unit.

The converting unit can comprise between 1 and n bremsstrahlung converters, wherein n is comprised between 2 and 8, preferably between 3 and 5, separated from one another by cooling channels. The converter cooling system can comprise gas or liquid forced cooling flowing through the channels.

The present disclosure also provides a process for producing a radioisotope by X-ray irradiation of a target comprising,

- providing a system as defined supra,
- loading a target onto the target holder,
- scanning and focusing an accelerated electron beam onto the converting unit to produce X-ray, and
- irradiating the target with the thus produced X-ray.

The target can be selected from one of $^{226}$Ra for producing $^{225}$Ac, or $^{199}$Mo for forming $^{99m}$Tc, or $^{186}$W for producing $^{187}$Re, or $^{134}$Xe to form $^{131}$I, or $^{68}$Zn for producing $^{67}$Cu.

BRIEF DESCRIPTION OF THE FIGURES

For a fuller understanding of the nature of the present disclosure, reference is made to the following detailed description taken in conjunction with the accompanying drawings in which:

FIG. 1(*b*) shows a perspective view of a first embodiment of a system according to the present disclosure.

FIG. 1(*c*) shows a perspective view of a second embodiment of a system according to the present disclosure.

FIG. 4(*b*) shows the maximum distance (La) traversed by the electron beam across a curved sheet of Bremsstrahlung converter according to the present disclosure, with 65°≤α≤115°.

FIG. 4(*c*) shows a maximum distance (L90) traversed by the electron beam across a curved sheet of Bremsstrahlung converter according to a preferred embodiment of the present disclosure, with α=90°.

FIG. 4(*d*) plots a normalized maximum distance (Lα/L90) traversed by the electron beam across a curved sheet of Bremsstrahlung converter according to the present disclosure as a function of the angle, a; the lowest value of Lα is L90 at α=90°.

FIG. 5(*b*) shows a height (ci) representative of a scanned area of curved bremsstrahlung converters according to the present disclosure, traversed by the scanned beam.

FIG. 5(*c*) compares the heights (hi, ci) of bremsstrahlung converters traversed by the scanned beam according to the prior art with the present disclosure.

FIG. 5(*d*) plots the heights ratio (c1/h1) of bremsstrahlung converters traversed by the scanned beam as a function of the focusing half-angle (β).

FIG. 6(*b*) shows perspective view of the embodiment illustrated in FIG. 1(*b*) illustrating the first and second focusing points (Fx, Fy) wherein Fx≠Fy.

DETAILED DESCRIPTION

Figure 1A:
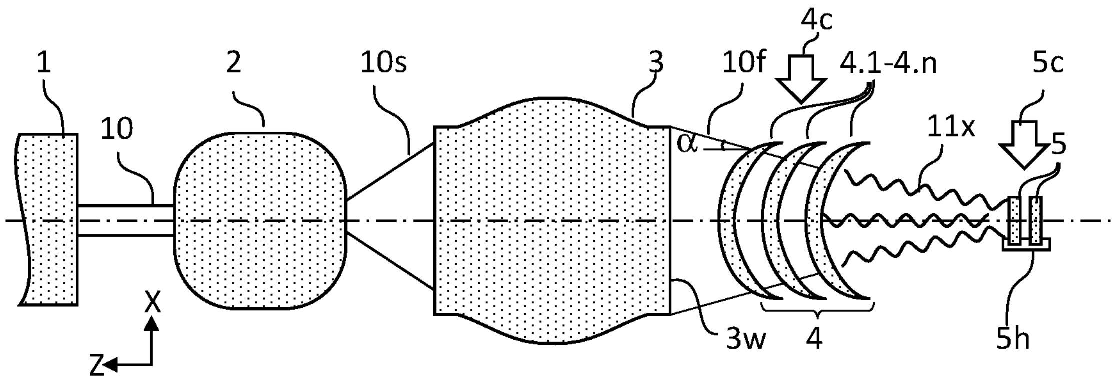
FIG. 1(*a*) shows a side view of a system according to the present disclosure.
Figure 1B:
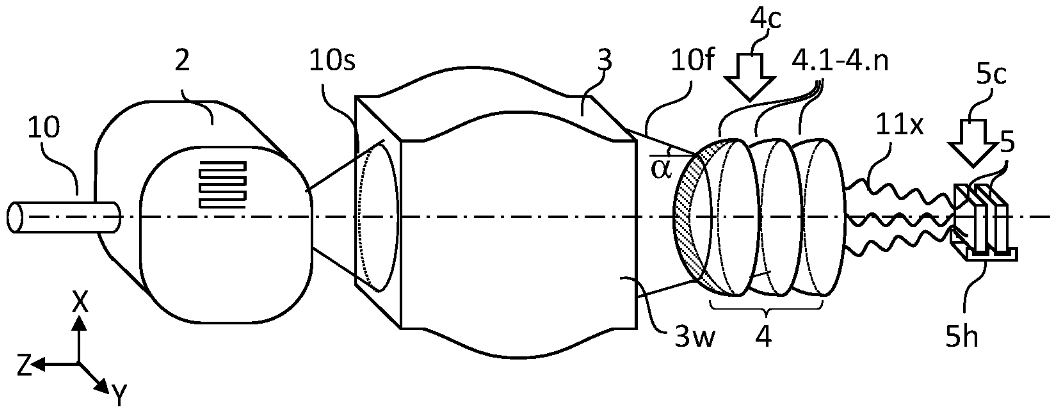
Figure 1C:
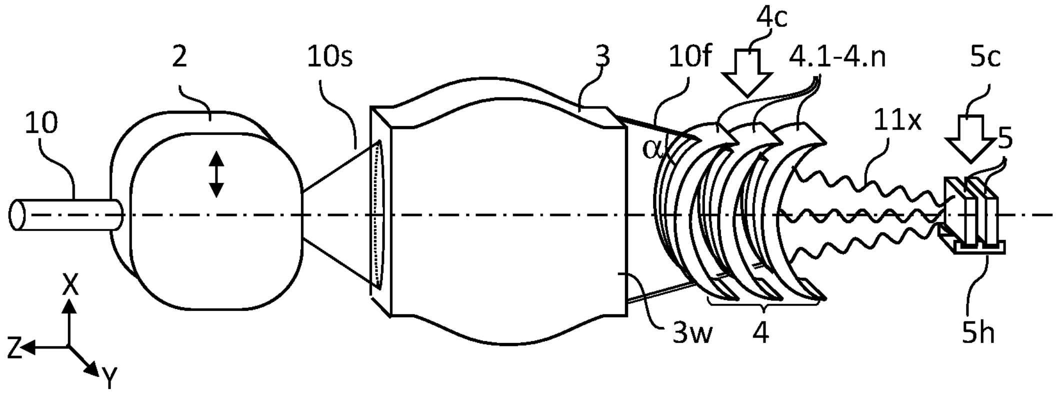

As shown in FIGS. 1(*a*)-(*c*), the present disclosure provides a system for producing radioisotopes by conversion of an electron beam into a photon beam and irradiation therewith of a target (5). The system comprises an electron accelerator (1) configured for generating an electron beam (10) of accelerated electrons along an irradiation axis (Z). A scanner provided as a scanning unit (2) is interposed downstream of the electron accelerator, along the irradiation axis (Z). The scanning unit (2) is configured for deviating the electron beam (10) along a predefined scanning pattern to form a scanned beam (10*s*). A focuser provided as a focusing unit (3) is interposed downstream of the scanning unit, along the irradiation axis (Z). The focusing unit comprises one or more magnets (3*m*) (shown in FIG. 2) configured for focusing the scanned beam (10*s*) over a first irradiation plane (X, Z) towards a first focusing point (Fx) (shown in FIG. 2) located on the irradiation axis (Z), to form a focused beam (10*f*), wherein the first irradiation plane (X, Z) is defined by the irradiation axis (Z) and a first transverse axis (X), with X⊥Z.

A converter provided as a converting unit (4) is located between the focusing unit (3) and the first focusing point (Fx). The converting unit comprises one or more bremsstrahlung converters (4.1-4.*n*), configured for converting the focused beam (10*f*) into a photon beam (11*x*). The converting unit is equipped with a converter cooling system (4*c*) configured for cooling the one or more bremsstrahlung converters (4.1-4.*n*).

A target holder (5*h*) configured for holding a target (5) exposed at the first focusing point (Fx). The target holder is equipped with a target cooling unit (5*c*) configured for cooling the target (5) when held in the target holder (5*h*).

The electron accelerator (1), the scanning unit (2), the focusing unit (3), the converting unit (4), and the target holder (5*h*), are all aligned along the irradiation axis (Z) and arranged downstream of one another in that sequence, wherein "downstream" is defined relative to the electron beam direction.

The gist of the present disclosure is that the one or more bremsstrahlung converters (4.1-4.*n*) are curved such that the focused beam (10*f*) intersects each of the one or more bremsstrahlung converters (4.1-4.*n*) with an intersecting angle (α) comprised between 65° and 115° at all points, preferably between 75° and 105° at all points, more preferably the intersecting angle (α) is equal to 90°±5°.

Electron Accelerator (1)

Electron accelerators are well known in the art. The present disclosure is not restricted to any particular type of electron accelerator, as long as it is capable of producing an electron beam (10) of energy of between 10 and 40 MeV, preferably between 15 and 30 MeV, preferably between 20 and 25 MeV. The diameter of the electron beam (10) can be less than 10 mm. The electron accelerator (1) can be for example a linear particle accelerator (e.g., linac) or a petal-like accelerator (e.g., rhodotron).

Scanning Unit (2)

Scanning units are well known in the art. The present disclosure is not restricted to any particular type of scanning unit, as long as it is capable of scanning the electron beam (10) along the predefined scanning pattern to form the scanned beam (10*s*). Upon impinging with the bremsstrahlung converters, only a fraction of the energy of the electron beam is converted into X-ray energy. The rest is dissipated in heat. Scanning the electron beam on the converter yields a flat beam distribution over the whole surface of the converter and reduces the concentration of the beam power and heating in a small, scanned area of the converter.

The scanning unit (2) can be equipped with scanning magnetic coils (2*m*) (shown in FIG. 2) laterally of the electron beam (10). The scanning magnetic coils can be configured to scan the electron beam linearly, along a first transverse direction (X) as illustrated in FIG. 1(*c*). Alternatively, the scanning magnetic coils can be configured to scan the electron beam over a scanned area, along first and second transverse directions (X, Y) as illustrated in FIG. 1(*b*).

In a first embodiment, the scanning unit (2) is configured for deviating the electron beam (10) along the predefined scanning pattern extending along the first transverse axis (X) only. Alternatively, in a second embodiment, the scanning unit (2) is configured for deviating the electron beam (10) along the predefined scanning pattern extending along the first transverse axis (X) and a second transverse axis (Y), wherein X⊥Y⊥Z.

As discussed supra, scanning the electron beam over a first and optionally a second transverse direction onto the converter facilitates the cooling of the converter. It yields, however, a wider geometric spread of the photon beam thus formed. In some cases, where large targets are available, this can be an advantage. When the target material is scarce, however, and targets of small dimensions must be used, such as with $^{226}$Ra, a wide geometric spread of the X-rays can become an inconvenience. For this reason, it has been proposed in the art to use a focusing unit to converge the scanned beam (10*s*) to focus the beam onto the converter via focusing magnetic coils (3*m*).

Focusing Unit (3)

With targets of smaller dimensions, a scanned beam (10*s*) cannot be used efficiently as such. because the photons beam (11*x*) formed by the interaction of the scanned electron beam with the converting unit (4) is also spread out. Refocusing of either the scanned beam (10*s*) or the photon beam (11*x*) is required for targets of small dimensions. Focusing of the photon beam (11*x*) is described, e.g., in WO2012022491. In the present disclosure, the system comprises a focusing unit (3) located upstream of the converting unit (4) for focusing the scanned beam (10*s*) to form the focused beam (10*f*).

The focusing unit (3) is configured for focusing the scanned beam (10*s*) over a first irradiation plane (X, Z) towards the first focusing point (Fx) located on the irradiation axis (Z), to form the focused beam (10*f*). The first irradiation plane (X, Z) is defined by the irradiation axis (Z) and the first transverse axis (X), with X⊥Z. Focusing units of this type are well known in the art. The present disclosure is not restricted to any particular type of focusing unit (3), as long as it is capable of focusing the scanned beam (10*s*) towards the first focusing point (Fx) as it is being scanned to form the focused beam (10*f*). With targets of smaller dimensions, focusing points (Fx) of correspondingly smaller dimensions are required.

Figure 2:
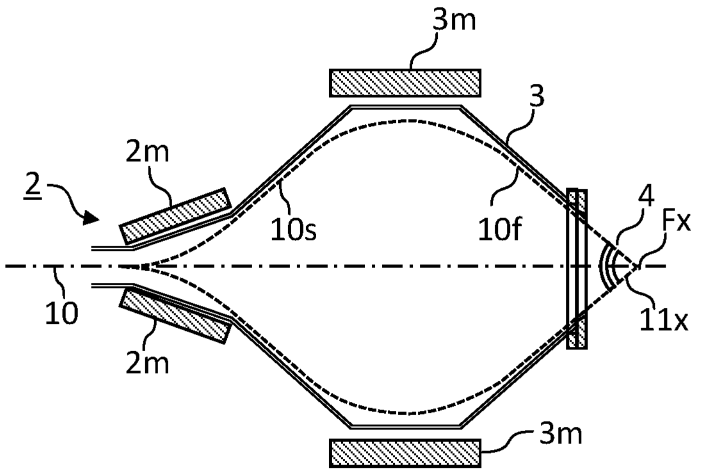
FIG. 2 shows a view of scanning and focusing units according to the present disclosure.

As illustrated in FIG. 2, the focusing unit (3) of the scanned beam (10*s*) may comprise a lens formed from focusing magnetic coils (3*m*), forming a multipole lens, for example a quadrupole, a hexapole, or an octupole lens. The thus formed focused beam (10*f*) is still scanning over the first and optionally the second transverse directions (X, Y) but, as illustrated in FIG. 5(*b*), from all points of the scanning pattern, the focused beam converges towards the first focusing point (Fx). Since the converting unit (4) is positioned between the focusing unit (3) and the first focusing point (Fx) the focused beam (10*f*) scans over a scanned area of the converting unit (4), thus distributing the energy of the focused beam over a larger scanned area.

Figure 6:
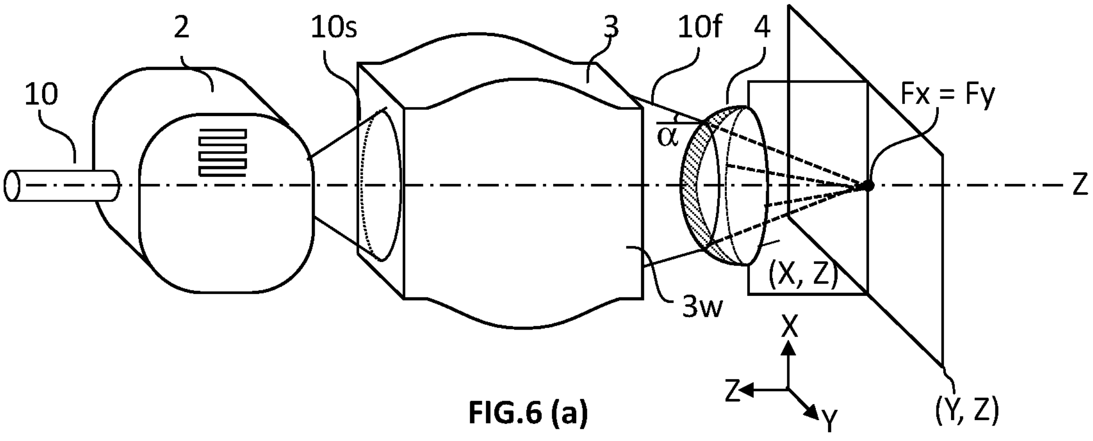
FIG. 6(*a*) shows perspective view of the embodiment illustrated in FIG. 1(*b*) illustrating first and second focusing points (Fx, Fy) wherein Fx=Fy.
Figure 6:
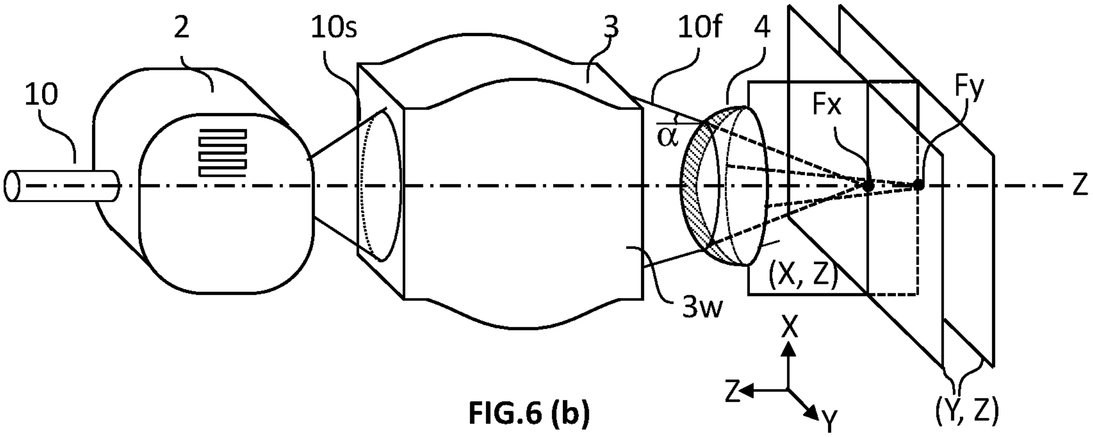

In the embodiment, wherein the scanning unit (2) is configured for deviating the electron beam (10) along the predefined scanning pattern extending along the first transverse axis (X) and a second transverse axis (Y), the focusing unit (3) can be configured for focusing the scanned beam (10*s*) also over a second irradiation plane (Y, Z) towards a second focusing point (Fy) located on the irradiation axis (Z). The second focusing point (Fy) can be same as, or different from the first focusing point (Fx), as shown in FIGS. 6(*a*) and 6(*b*), respectively.

Figure 3:
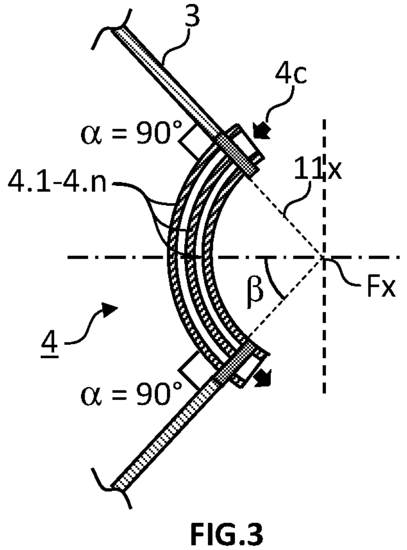
FIG. 3 shows an example of a converting unit according to the present disclosure.
Figure 4B:
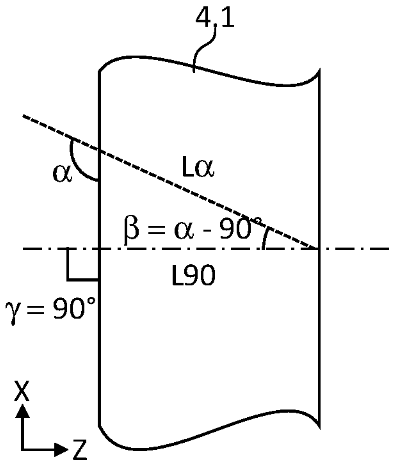
FIG. 4(*a*) shows a maximum distance (La) traversed by the electron beam across a straight sheet of Bremsstrahlung converter according to the prior art, with α=/β+90°.
Figure 4B:
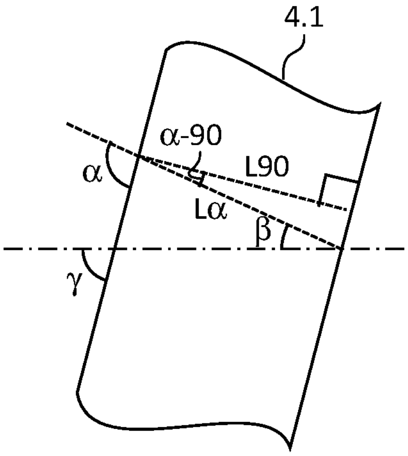
Figure 4C:
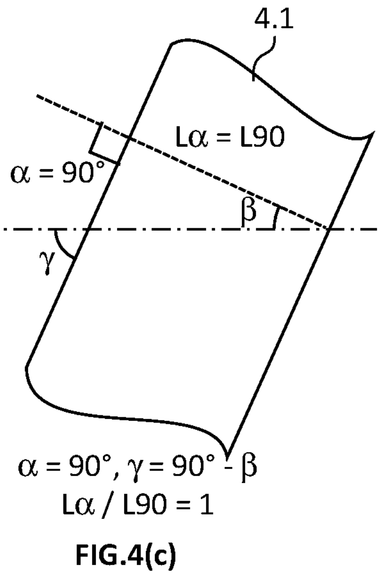
Figure 4D:
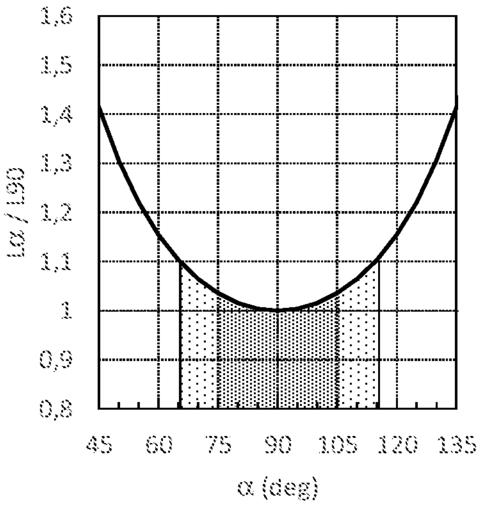
Figure 5B:
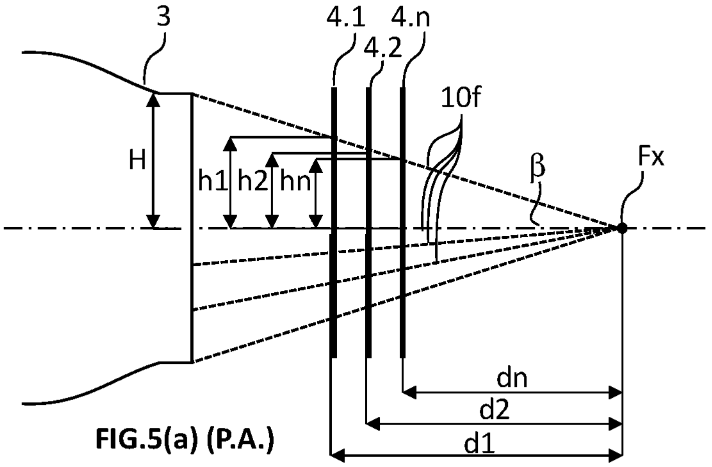
FIG. 5(*a*) shows a height (hi) representative of a scanned area of straight bremsstrahlung converters according to the prior art, traversed by the scanned beam.
Figure 5B:
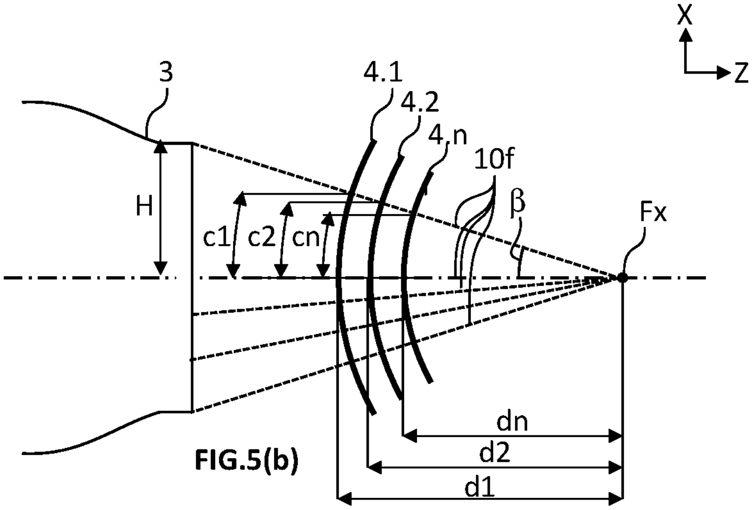
Figure 5C:
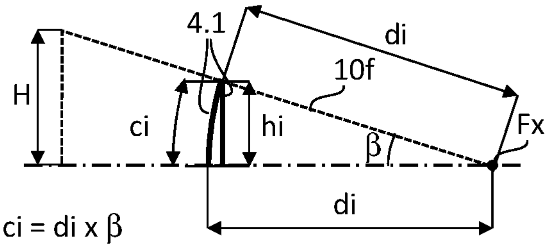
Figure 5D:
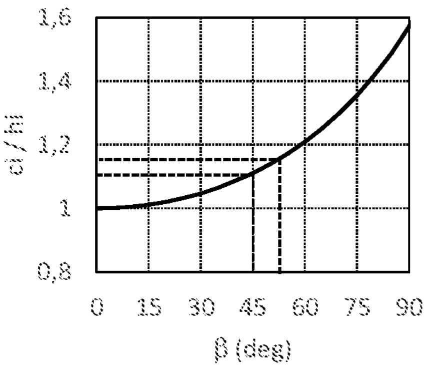

The focusing half-angle (β) shown in FIGS. 3, 4(*a*) to 4(*c*), and 5(*a*) to 5(*c*), and formed at the first focusing point (Fx) between the irradiation axis (Z) and the outer envelope of the electron beam thus focused can be comprised between 20 and 55°, preferably between 30 and 45°. If the scanned beam (10*s*) is scanned over both first and second transverse directions (X, Y) the focusing half-angle (β) formed at the second focusing point (Fy), if different from the first focusing point (Fx), can be comprised within the same ranges as defined supra.

Converting Unit (4)

As shown in FIG. 5(*a*), a converting unit is traditionally formed by a number of bremsstrahlung converters (4.1-4.*n*) in the form of flat sheets of a high-Z number metal aligned one behind the other along the irradiation axis (Z) and separated from one another by cooling channels. There are two main problems with arranging such converting unit downstream of the focusing unit (3).

First, as represented in FIG. 4(*a*), it can be seen that the electrons located most outwards in the focused beam (10*f*)

intersect the bremsstrahlung converter sheet (4.1) with an intersecting angle (α) larger than 90°, whilst the electrons moving along the irradiation axis (Z) intersect the bremsstrahlung converter sheet (4.1) with an intersecting angle (α) of 90°. As clearly visible in FIG. 4(*a*) and plotted in FIG. 4(*d*), the length (L α) of bremsstrahlung material traversed by the electrons strongly depends on the intersecting angle (α) with a minimum length (L90) at an angle of the intersecting angle, α=90° (cf. FIG. 4(*d*)). This means that outermost electrons, travelling a longer path (Lα) across the bremsstrahlung material release more energy, and thus more heat, than the electrons travelling closer to the irradiation axis (Z) with a path length close to or of L90. This is problematic, because there is a gradient of temperature over the scanned area of a bremsstrahlung converter, and because the outermost electrons, having released more energy at the first bremsstrahlung sheet, have less energy for the following sheets than the innermost electrons; travelling closer to the irradiation axis (Z).

Second, as illustrated in FIGS. 5(*a*), 5(*c*), and 5(*d*), the scanned area of each bremsstrahlung sheet traversed by the focused beam (10*f*) is smaller when the bremsstrahlung sheets are flat than when they are curved. FIG. 5 shows side views or projections on the plane (X, Z) and the two-dimensional areas in a 3-D system are reduced to one-dimensional lengths, (hi, ci, with i=1 to n) in the 2-D projections of FIG. 5. The term "area" is therefore used when referring to the lengths hi or ci, leaving the reader to mentally multiply the lengths hi and ci by a corresponding length in the second transverse direction (Y) to yield a magnitude in [$m^2$].

In FIG. 5(*a*), the scanned area of bremsstrahlung sheet crossed by the focused electron beam (10*f*) is represented by the lengths (hi, i=1 to n). Referring to FIG. 5(*c*), the lengths hi can be calculated as a function of the focusing half-angle (β).as hi=di×sin β, wherein di is the distance separating the $i^{th}$ bremsstrahlung converter (4.*i*) from the first focusing point (Fx) (measured along the irradiation axis (Z)). Increasing the scanned area of bremsstrahlung crossed by the focused beam (10*f*) would be advantageous, in particular if a large number (n) of bremsstrahlung sheets are used, as the scanned area decreases after each sheet, thus increasing the concentration of the beam energy onto smaller scanned areas.

The present disclosure proposes to replace the bremsstrahlung converters in the form of flat sheets used up to now in the art by curved bremsstrahlung converters (4.1-4.*n*) in the form of curved sheets, shown in FIG. 5(*b*) such that the focused beam (10*f*) intersects each of the one or more bremsstrahlung converters with an intersecting angle (α) comprised between 65° and 115° at all points, preferably between 75° and 105° at all points. Preferably, the intersecting angle is 90°. An intersecting angle of 90° at all points of the converting unit (4) can be obtained with bremsstrahlung converters in the form of sheets having a single curvature or optionally double curvature of radius (di) defined as the distance separating the curved sheets from the first and optionally second focusing points (Fx, Fy). If the first and second focusing points are the same, the bremsstrahlung sheets have the geometry of a spherical cap of radius (di). This solution solves, the foregoing two problems discussed supra, by yielding,

- a more homogeneous heat distribution across the scanned area of the bremsstrahlung sheets crossed by the focused beam (10*f*) and
- a larger scanned area of the bremsstrahlung sheets crossed by the focused beam (10*f*).

A More Homogeneous Heat Distribution

As shown in FIGS. 4(*b*) and 4(*c*), the intersecting angle (α) can be brought closer to or even equal to 90° by locally tilting the bremsstrahlung sheet with respect to the irradiation direction parallel to the irradiation axis (Z) by an angle γ. With an adequately curved bremsstrahlung sheet, the intersecting angle (α) can be reduced to between 65° and 115° at all points, preferably between 75° and 105° at all points. Referring to FIG. 4(*d*), it can be seen that in the intersecting angle (α) range comprised between 65° and 115° at all points, represented by a light shaded area, the normalized thickness (Lα/L90=1/sin α) of bremsstrahlung material traversed by two electrons of the focused beam (10*f*) can vary at most by about 10% (Lα/L90≈1.1). When the intersecting angle (α) range is reduced to between 75 and 105°, represented by the dark shaded area in FIG. 4(*d*), the normalized thickness (Lα/L90) varies by less than 4% for any two electrons of the focused beam (10*f*) (Lα/L90=1.04). If the intersecting angle α=90° at all points, the normalized thickness (Lα/L90=1) is constant for all electrons of the focused beam and the heat energy transferred to the bremsstrahlung converters (4.1-4.*i*) is distributed homogeneously over the whole scanned area of the converting unit (4) traversed by the focused beam (10*f*), without local areas of higher temperatures;

By contrast, a focused beam (10*f*) traversing a bremsstrahlung flat sheet as shown in FIG. 4(*a*) with an intersecting angle of, for example, α=135°, corresponding to a focusing half-angle β=α−90°=45°, the normalized thickness of the flat sheet traversed by the focused beam varies over 40% (Lα/L90=1.4 in FIG. 4(*d*)), yielding a proportionally comparable heat gradient across the flat sheet scanned area traversed by the focused beam (10*f*).

The use of bremsstrahlung converters (4.1-4.*n*) which are curved such that the focused beam (10*f*) intersects each of the one or more bremsstrahlung converters (4.1-4.*n*) with an intersecting angle (α) comprised between 65° and 115° at all points, clearly contributes to homogenizing over the scanned area of the bremsstrahlung converter the heat generated by the interaction with the focused beam. This renders the cooling of the converting unit easier than for flat sheets, and conventional cooling systems (4*c*) can be used with success.

A Larger Scanned Area

Referring to FIGS. 5(*a*) and 5(*c*), it can be seen that the scanned area, represented by the height (hi) of a converting unit formed by flat sheets can be characterized by a value, hi:=di×sin β, whilst the scanned area, represented by the curved height (ci) of a converting unit formed by curved sheets of radius (di) can be characterized by a value, ci:=di×β, The heights ratio (ci/hi) of the curved height (ci) according to the present disclosure to the height (hi) according to prior art can be expressed as ci/hi=β/sin β. The height ratio (ci/hi) is plotted in FIG. 5(*d*) as a function of the focusing half-angle (β). It can be seen that for a focusing half-angle of for example, β=45°, the curved bremsstrahlung converters have a scanned area (ci) which is 10% higher than the flat sheets. The scanned area is about 15% higher for a focusing half-angle of β=50°. This increase of the scanned area allows distributing the focused beam energy over a larger scanned area with curved bremsstrahlung converters, than with flat ones. The heat generated by the interaction of the focused beam and the scanned area of the converting unit is therefore reduced accordingly, further facilitating the cooling of the converting unit (4).

Geometries of the Bremsstrahlung Converters (4.1-4.*n*)

The one or more bremsstrahlung converters (4.1-4.*n*) can be in the shape of a section of cylinder, defined by a curved cross-section in the first transverse plane (X, Z), and generatrixes extending along a second transverse axis (Y), wherein X⊥Y⊥Z. This geometry is preferred in case the scanning unit (2) is configured for deviating the electron beam (10) along the predefined scanning pattern extending along the first transverse axis (X) only. It could also be preferred in case the target (5) has a length defining an elongated shape, and the scanned beam needs not be focused over a plane including the length of the elongated target. A converting unit (4) of this type is illustrated in FIG. 1(*c*).

In an alternative embodiment, the one or more bremsstrahlung converters (4.1-4.*n*) are in the shape of an ovoid cap, preferably a spherical cap, defined by a first curved cross-section in the first irradiation plane (X, Z) and by a second curved cross-section in the second irradiation plane (Y, Z). This type of converting unit is illustrated in FIG. 1(*b*) and is particularly adapted in case the scanning unit (2) is configured for deviating the electron beam (10) along the predefined scanning pattern extending along the first transverse axis (X) and a second transverse axis (Y), wherein X⊥Y⊥Z, and the focusing unit (3) is configured for focusing the scanned beam (10*s*) also over a second irradiation plane (Y, Z) towards a second focusing point (Fy) located on the irradiation axis (Z), wherein the second focusing point (Fy) can be the same as, or different from the first focusing point (Fx). In a preferred embodiment, the first and second focusing points (Fx, Fy) are the same focusing point (i.e., Fx=Fy).

In both embodiments (i.e., single or double curvature) it is preferred that the radius of curvature of the curved sections be constant, i.e., defining an arc of circle, or a spherical cap, respectively. The radius of curvature is preferably close to the distance (di) separating a bremsstrahlung converter (4.1-4.*n*) to the first focusing point (Fx).

In a preferred embodiment, each of the one or more bremsstrahlung converters (4.1-4.*n*) has a first curved cross-section in the first irradiation plane (X, Z) defined by a substantially circular arc of radius (d1-*dn*) centered on the first focusing point (Fx). A "substantially circular arc" is defined herein as a curved segment having a radius of curvature which varies by not more than 10% over a length of the curved arc. With this geometry, the focused beam (10*h*) reaches the bremsstrahlung converters with an intersecting angle α=90° along the first irradiation plane (X, Z).

In yet another preferred embodiment, each of the one or more bremsstrahlung converters (4.1-4.*n*) has a second curved cross-section in the second irradiation plane (Y, Z) defined by a substantially circular arc of radius (d1-*dn*) centered on the second focusing point (Fy). It is preferred that the second focusing point (Fy) be the same as the first focusing point (Fx) (i.e., Fx=Fy), defining a geometry of spherical cap centered on the single focusing point (Fx=Fy).

As shown in FIG. 3, the converting unit (4) comprises between 1 and n bremsstrahlung converters (4.1-4.*n*), wherein n is comprised between 2 and 8, preferably between 3 and 5, separated from one another by cooling channels. The converter cooling system (4*c*) can comprise gas or liquid forced cooling, with a cooling fluid flowing through the cooling channels to withdraw heat from the bremsstrahlung converters generated by the interaction with the focused beam (10*f*). This configuration defines what is herein referred to as a "conventional cooling system" which is well known to the persons skilled in the art.

Each of the one or more bremsstrahlung converters (4.1-4.*n*) has a thickness (L90) measured along a radius of curvature, of not more than 3 mm, preferably the thickness (L90) is comprised between 0.2 and 2.5 mm, more preferably between 0.5 and 1.5 mm. The radius of curvature at one point of a bremsstrahlung converter is defined as the radius of a circle which touches the bremsstrahlung converter at that point and has the same tangent and curvature at that point. The radius of curvature is therefore normal to the tangent of the bremsstrahlung converter at that point. This is illustrated in FIGS. 4(*a*) to 4(*c*), as indicated by L90. The thickness (L90) is also the shortest straight line crossing the bremsstrahlung converter from one surface to an opposite surface.

In a preferred embodiment, the $n^{th}$ bremsstrahlung converter (4.*n*) in the sequence of n bremsstrahlung converters, which is located nearest the target holder (5*h*) has a larger thickness (L90) than the first bremsstrahlung converter (4.1) located nearest the focusing unit (3). Preferably, each bremsstrahlung converter (4.*i*) in the sequence is thicker than the adjacent bremsstrahlung converter (4.(*i*-1)) located upstream, i.e., L90(41)>L90(4.(*i*-1)). Since the scanned areas of the bremsstrahlung converters decreases as the bremsstrahlung converters are nearer the first focusing point (Fx), increasing the thicknesses of the bremsstrahlung converters located downstream in the sequence allows homogenizing the volume of bremsstrahlung converter material interacting with the focused beam (10*f*). This way all bremsstrahlung converters contribute equally to the production of X-rays. The heating generated by the interaction which must be evacuated is also more homogeneously distributed between the various bremsstrahlung converters of the converting unit (4), thus facilitating the cooling thereof.

The 1 to n bremsstrahlung converters (4.1-4.*n*) can be made of tantalum (Ta) or tungsten (W), or titanium (Ti).

Target (5) and Target Holder (5*h*)

Because of the use of a focusing unit, the system of the present disclosure is particularly suitable for targets (5) of small dimensions. The target (5) can be $^{226}$Ra for producing $^{225}$Ac commonly used for diagnostic imaging. Other examples of targets which can be used with the system of the present disclosure to form diagnostic imaging isotopes include $^{100}$Mo-target for forming $^{99m}$Tc, or $^{186}$W-target for producing $^{187}$Re, or $^{134}$Xe to form $^{131}$I, or $^{68}$Zn for producing $^{67}$Cu, and the like.

As the transmutation reaction caused by the interaction of the X-ray (11*x*) with the target generates heat, a target cooling system (5*c*) is provided, which is configured for cooling the target (5) when held in the target holder (5*h*). Like the converter cooling system (4*c*) discussed supra, the target cooling system (5*c*) can comprise gas or liquid forced cooling, with a refrigerating fluid flowing through cooling channels in thermal contact with the target (5). Keeping the temperature of the target (5) below a degradation temperature is of course important.

If the first and second focusing points are the same (i.e., Fx=Fy) and the X-ray thus produced by the converting unit (4) converge towards a small converging area around the focusing point (Fx), the sample holder can be configured for moving the target (5) such that a larger area of the target is scanned by the focusing point (which is static). This is particularly interesting in case of targets of larger dimensions, whose exposed area is larger than the converging area of the X-ray, so that transmutation occurs over a larger area/volume of the target than if it remained static.

Process for Producing a Radioisotope

The system of the present disclosure can be used in a process for producing a radioisotope by X-ray irradiation of a target. The process comprises providing a system as described supra. After loading a target (5) onto the target holder (5*h*), scanning and focusing an accelerated electron beam onto the converting unit (4) to produce X-ray, to irradiate the target with the thus produced X-ray.

The target can be for example, $^{226}$Ra for producing $^{225}$Ac, or $^{100}$Mo-target for forming $^{99m}$Tc, or $^{186}$W-target for producing $^{187}$Re, or $^{134}$Xe to form $^{131}$I, or $^{68}$Zn for producing $^{67}$Cu, and the like.

| REF | DESCRIPTION |
|---|---|
| 1 | Electron accelerator |
| 2 | Scanning unit |
| 2m | Scanning magnetic coils |
| 3 | Focusing unit |
| 3m | Focusing magnetic coils |
| 4 | Converting unit |
| 4.1-4.n | Bremsstrahlung converter |
| 4c | Converter cooling system |
| 5 | Target |
| 5c | Target cooling system |
| 5h | Target holder |
| 10 | Electron beam |
| 10f | Focused beam |
| 10s | Scanned beam |
| 11x | Photon beam |
| c1-cn | Length of cross-section of curved Bremsstrahlung converter irradiated by focused beam |
| d1-dn | Distance between $i^{th}$ Bremsstrahlung converter and first focusing point |
| Fx, Fy | Focusing point of the focused beam along the first and second irradiation planes (X, Z) & (Y, Z) |
| h1-hn | Length of cross-section of straight Bremsstrahlung converter irradiated by focused beam |
| L90 | Thickness of Bremsstrahlung converter measured normal to the surface thereof |
| La | Thickness of Bremsstrahlung converter measured along an angle a with the surface thereof |
| X | First transverse axis |
| Y | Second transverse axis |
| Z | Irradiation axis |
| α | Angle between the focused beam and the surface of a Bremsstrahlung converter |
| β | Focusing half-angle of the focused beam with the irradiation axis (Z) at the focusing point |
| γ | Angle between the surface of a Bremsstrahlung converter and the irradiation axis (Z) |

What is claimed is:

1. A system for producing radioisotopes, the system comprising:

an electron accelerator configured to generate an electron beam of accelerated electrons along an irradiation axis;

a scanner configured to diverge the electron beam along a scanning pattern to form a scanned beam;

a focuser comprising one or more magnets configured to focus the scanned beam over an irradiation plane converging towards a focusing point located on the irradiation axis, to form a focused beam, wherein the irradiation plane is defined by the irradiation axis and a transverse axis, the transverse axis being perpendicular to the irradiation axis;

a converting unit located between the focuser and the focusing point and comprising one or more bremsstrahlung converters, the converting unit configured to convert the focused beam into a photon beam, wherein each of the one or more bremsstrahlung converters is curved such that the focused beam intersects the one or more bremsstrahlung converters with an intersecting angle between 65° and 115° at a plurality of points;

a converter cooling system configured to cool the one or more bremsstrahlung converters; and a target holder configured for holding a target, wherein the electron accelerator, the scanner, the focuser, the converting unit, and the target holder are aligned along the irradiation axis and arranged in sequence along a direction of the electron beam.

2. The system of claim 1, wherein:

the focusing point is a first focusing point;

the transverse axis is a first transverse axis;

the irradiation plane is a first irradiation plane;

the scanner is configured to diverge the electron beam along the scanning pattern extending along the first transverse axis and a second transverse axis, the second transverse axis being perpendicular to the first transverse axis and the irradiation axis;

the focuser is configured to focus the scanned beam over a second irradiation plane towards a second focusing point located on the irradiation axis, wherein the second focusing point is the same as or different from the first focusing point; and the one or more bremsstrahlung converters are in a shape of an ovoid cap, defined by a first curved cross-section in the first irradiation plane and by a second curved cross-section in the second irradiation plane.

3. The system of claim 1, wherein:

the transverse axis is a first transverse axis;

the scanner is configured to diverge the electron beam along the scanning pattern extending along the first transverse axis only; and the one or more bremsstrahlung converters are in a shape of a section of cylinder, defined by a curved cross-section in the irradiation plane and generatrixes extending along a second transverse axis, the second transverse axis being perpendicular to the first transverse axis and the irradiation axis.

4. The system according to claim 1, wherein the focuser is configured for forming the focused beam, with a focusing half-angle formed at the focusing point with the irradiation axis on the irradiation plane, wherein the focusing half-angle is between 2° and 55°.

5. The system according to claim 1, wherein each of the one or more bremsstrahlung converters has a curved cross-section in the irradiation plane defined by a substantially circular arc of radius centered on the focusing point, wherein the substantially circular arc includes a curved segment having a radius of curvature that is not more than 10% over a length of the curved cross-section.

6. The system according to claim 5, wherein the irradiation plane is a first irradiation plane; the curved cross-section is a first curved cross-section; the focusing point is a first focusing point; and each of the one or more bremsstrahlung converters has a second curved cross-section in a second irradiation plane defined by a substantially circular arc of radius centered on the second focusing point, wherein the second focusing point is the same as the first focusing point.

7. The system according to claim 1, wherein each of the one or more bremsstrahlung converters has a thickness along a radius of curvature, the thickness being not more than 3 millimeters.

8. The system according to claim 1, wherein the one or more bremsstrahlung converters comprise at least two bremsstrahlung converters, a first one of the least two bremsstrahlung converters located nearest the target holder having a larger thickness than a second one of the at least two bremsstrahlung converters located nearest the focuser.

9. The system according to claim 1, wherein the one or more bremsstrahlung converters comprise no more than eight bremsstrahlung converters, and when the one or more bremsstrahlung converters comprise at least two bremsstrahlung converters, the at least two bremsstrahlung converters are separated from one another by cooling channels.

10. The system according to claim 1, wherein the converter cooling system comprises gas or liquid forced cooling.

11. The system according to claim 10, wherein the one or more bremsstrahlung converters are made of tantalum or tungsten or titanium.

12. The system according to claim 1, wherein the intersecting angle is between 75° and 105°.

13. The system according to claim 2, wherein each of the one or more bremsstrahlung converters is in a shape of a spherical cap.

14. The system according to claim 4, wherein the focusing half-angle is between 30° and 45°.

15. The system according to claim 7, wherein each of the one or more bremsstrahlung converters has a thickness between 0.2 and 2.5 millimeters.

16. The system according to claim 7, wherein each of the one or more bremsstrahlung converters has a thickness between 0.5 and 1.5 millimeters.

17. The system according to claim 9, wherein the at least two bremsstrahlung converters comprise three, four, or five bremsstrahlung converters.

18. A method for producing a radioisotope wherein a system for producing the radioisotope includes: an electron accelerator configured to generate an electron beam of accelerated electrons along an irradiation axis, a scanner configured to diverge the electron beam along a scanning pattern to form a scanned beam, a focuser including one or more magnets configured to focus the scanned beam over an irradiation plane converging towards a focusing point located on the irradiation axis, to form a focused beam, the irradiation plane being defined by the irradiation axis and a transverse axis, the transverse axis being perpendicular to the irradiation axis, a converting unit located between the focuser and the focusing point and having one or more bremsstrahlung converters, the converting unit configured to convert the focused beam into a photon beam, each of the one or more bremsstrahlung converters being curved such that the focused beam intersects the one or more bremsstrahlung converters with an intersecting angle between 65° and 115° at a plurality of points, a converter cooling system configured to cool the one or more bremsstrahlung converters, and a target holder configured for holding a target, the electron accelerator, the scanner, the focuser, the converting unit, and the target holder being aligned along the irradiation axis and arranged in sequence along a direction of the electron beam, the method comprising:

loading the target onto the target holder;

scanning and focusing an accelerated electron beam onto the converting unit;

converting, by the converting unit, the electron beam to produce X-ray; and irradiating the target with the X-ray to produce the radioisotope.

19. The method according to claim 18, wherein the target includes one of $^{226}$Ra for producing $^{225}$Ac, or $^{100}$Mo for producing $^{99m}$Tc, or $^{186}$W for producing $^{187}$Re, or $^{134}$Xe for producing $^{131}$I, or $^{68}$Zn for producing $^{67}$Cu.

20. A method for producing a radioisotope by X-ray irradiation, the method comprising:

providing the system according to claim 1;

loading the target onto the target holder;

scanning and focusing an accelerated electron beam onto the converting unit to produce X-ray; and irradiating the target with the X-ray.

* * * * *